United States Patent
Lu et al.

(10) Patent No.: US 8,714,569 B2
(45) Date of Patent: May 6, 2014

(54) MODULAR CART

(75) Inventors: Der-Wei Lu, New Taipei (TW);
Chung-Cheng Hu, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 0 days.

(21) Appl. No.: 13/588,034

(22) Filed: Aug. 17, 2012

(65) Prior Publication Data

US 2013/0307236 A1    Nov. 21, 2013

(30) Foreign Application Priority Data

May 21, 2012 (TW) .............................. 101118016 A

(51) Int. Cl.
*B62B 3/02* (2006.01)
*F16M 13/02* (2006.01)

(52) U.S. Cl.
CPC .................................. *F16M 13/02* (2013.01)
USPC ......................................................... 280/35

(58) Field of Classification Search
USPC ............. 280/651, 47.371; 403/110, 183, 331, 403/381, 252, 264, 255; 108/158; 104/106, 104/108, 110; 211/175, 207, 208, 187, 190, 211/103, 196, 205, 133.4, 107
See application file for complete search history.

(56) References Cited

U.S. PATENT DOCUMENTS

| | | | | |
|---|---|---|---|---|
| 2,685,487 | A * | 8/1954 | Woller | 108/146 |
| 4,488,497 | A * | 12/1984 | Bevans | 108/147.21 |
| 6,240,856 | B1 * | 6/2001 | Paskey et al. | 108/146 |
| 6,408,587 | B2 * | 6/2002 | Cronin et al. | 52/637 |
| 6,446,313 | B2 * | 9/2002 | Pfister | 24/514 |
| 6,688,634 | B2 * | 2/2004 | Noffsinger | 280/651 |
| 6,857,378 | B2 * | 2/2005 | Franze et al. | 108/147.19 |
| 7,341,006 | B2 * | 3/2008 | Hernandez | 108/115 |
| 7,997,207 | B2 * | 8/2011 | Hess | 104/95 |
| 8,100,061 | B2 * | 1/2012 | Hookway et al. | 108/50.01 |
| 8,286,977 | B2 * | 10/2012 | Butler et al. | 280/47.35 |

FOREIGN PATENT DOCUMENTS

TW              471311          1/2002

* cited by examiner

*Primary Examiner* — J. Allen Shriver, II
*Assistant Examiner* — Brian Cassidy

(57) ABSTRACT

The instant disclosure relates to a modular cart, which includes a base and a tower. The tower can be assembled and disassembled. The base has a mounting seat supported on wheels. The wheels allow the mounting seat to move on a working surface. The mounting seat further defines an axis extending away from the working surface. The tower is mounted on the mounting seat and has N number of main bodies and N−1 number of couplers. With N≥2, the main bodies and the couplers are interconnected into a predetermined length. Each coupler is connected between two main bodies.

8 Claims, 6 Drawing Sheets

MODULAR CART

BACKGROUND OF THE INVENTION

1. Field of the Invention

The instant disclosure relates to a modular cart; more particularly, to a modular cart having a tower (vertically extending structural support) that can be assembled/disassembled.

2. Description of Related Art

One type of existing cart is disclosed in the Taiwan Patent No. 471311, titled "Improved Structure of Medical Cart". In FIG. 3 of this patent, the disclosed medical cart includes a base 30, a tower 31, and a plurality of medical apparatus A, B, C. The tower 31 has a fixed length and is mounted on the base 30. The medical apparatus A, B, C are disposed on a plurality of trays 32.

However, for the same cart, the manufacturer would not provide extra towers having different lengths. Instead, a height-adjusting mechanism is normally employed to address the need. In other words, for example, if an inspection cart and a medical cart have different heights, the same manufacturer will have to provide towers that have different lengths for each application. Both types of cart can not share the same tower. Thus, the manufacturing cost is raised. Furthermore, the package size of the cart is approximately defined by multiplying the surface area of the base and the length of the tower. When the tower is very long, the package size also increases, and thus raises the shipping costs.

SUMMARY OF THE INVENTION

The object of the instant disclosure is to provide a modular cart. The modular cart having a tower that could be easily assembled/disassembled to save manufacturing cost.

The module cart of the instant disclosure comprises a base and a tower. The base has a mounting seat supported on wheels. The wheels allow the mounting seat to be movably disposed on a working surface. An axis extending away from the working surface is defined on the mounting seat. The tower is mounted on the mounting seat. The tower includes N number of main bodies and N−1 number of couplers. N is an integer≥2. The main bodies and the couplers cooperate to form a pre-determined length, where each coupler is arranged between two main bodies.

Each coupler has a first coupling piece and a second coupling piece. The first coupling piece has a dovetail groove, and the second coupling piece has a dovetail. The dovetail interlocks the dovetail groove for mating the first and second coupling pieces.

Preferably, the first coupling piece has first mating portion formed with a dovetail groove. The second coupling piece has a second mating portion formed with a dovetail. The dovetail interlocks the dovetail groove along a direction perpendicular to the axis.

Preferably, the tapered inner face of the first mating portion and the tapered outer face of the dovetail interlock for mating the first and second coupling pieces.

Preferably, each of opposite ends of the main body is formed with a receiving space. The first coupling piece has a first connecting portion, and the second coupling piece has a second connecting portion. The receiving spaces of adjacent main bodies receive the first and second connecting portions.

Preferably, the first mating portion is formed with at least one first thru hole. The second mating portion is formed with at least one second thru hole. Fasteners such as screws are driven into the first and second thru holes for securing the first and second coupling pieces to the main bodies. The screws are oriented along a direction parallel to the axis.

Preferably, at least one screw is driven into the first and second coupling pieces in a direction perpendicular to the axis to interlock with each other.

Preferably, each main body can be made into at least two different lengths.

Preferably, the tower has a substantially U-shaped cross section that is perpendicular to the axis. In addition, the tower is formed with a trough that extends parallelly to the axis. At least one channel is formed on each of opposite outer surfaces of the tower extendingly. The cart further includes a cover mounted on the tower over the trough.

Preferably, the axis is substantially normal to the working surface.

Preferably, at least one screw is driven into the mounting seat and the tower in a direction along the axis for interlocking with each other.

For advantages, the modular cart provided by the instant disclosure has reduced package size to facilitate the shipping process. Furthermore, depending on the application, a modular cart having a suitably sized frame support combination can be provided to save the manufacturing cost.

For further understanding of the instant disclosure, reference is made to the following detailed description illustrating the embodiments and examples of the instant disclosure. The description is for illustrative purpose only and is not intended to limit the scope of the claim.

DETAILED DESCRIPTION OF EMBODIMENTS

Figure 1:
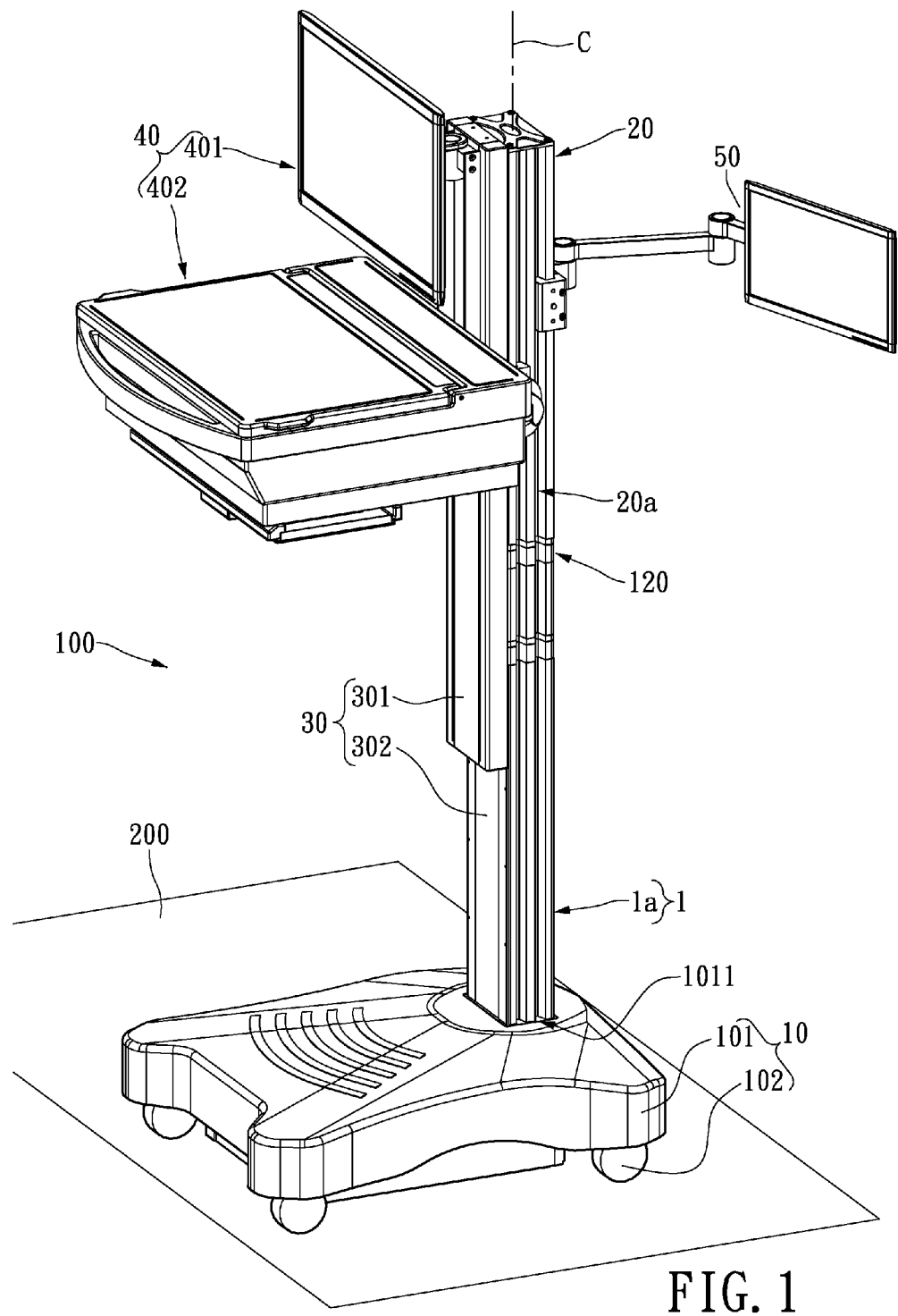
FIG. 1 is a perspective view showing an exemplary modular cart of the instant disclosure.

Referring to FIG. 1, an exemplary modular cart of the instant disclosure is shown by the numeral 100. The cart 100 comprises a base 10, a vertically extending support structure such as tower 20 that could be assembled/disassembled, a cover 30, a cart component 40, and a removable support arm 50.

The base 10 has a mounting seat 101 supported on wheels 102. A mounting portion 1011 is concavely formed on the mounting seat 101. The wheels 102 allow the mounting seat 101 to be slidably disposed on a working surface 200 (e.g., floor). An axis C is defined on the mounting seat 101 to extend perpendicularly away from the working surface 200. However, the extending direction is not restricted thereto.

Figure 2:
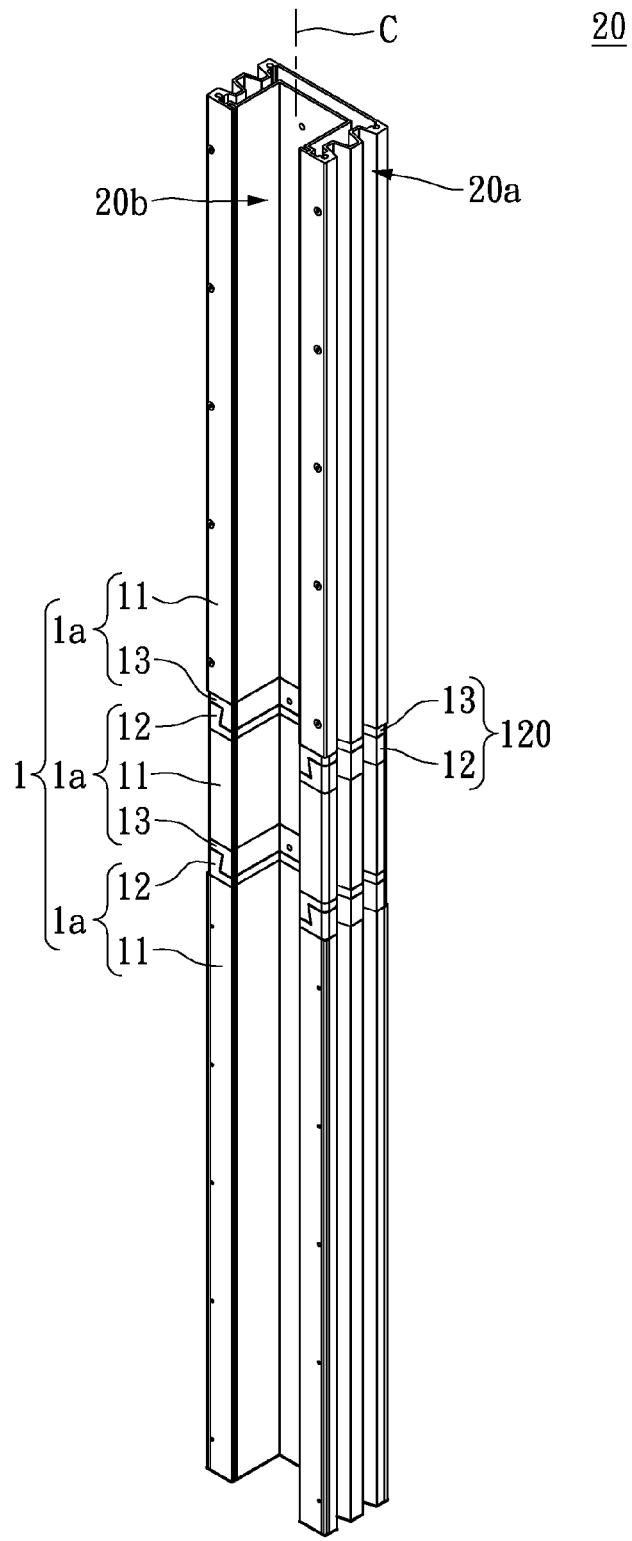
FIG. 2 is a perspective view showing the tower.

Please refer to FIG. 2. The cross-section of the tower 20 is perpendicular to the axis C and substantially U-shaped. A pair of C-shaped channels 20a is formed on each of opposite sides (i.e., the left-hand side and the right-hand side) of the tower 20 and parallel to the C axis. The channels 20a are utilized for removably mounting the support arm 50 (as shown in FIG. 1). The tower 20 further defines a trough 20b extending along the C axis.

More specifically, the tower 20 is constructed of a frame assembly 1. The frame assembly 1 includes N number of hollow main bodies 11 and N−1 number of couplers 120. N is an integer≥2, and each coupler 120 is connected between two main bodies 11. In other words, each coupler 120 holds adjacent main bodies 11 in position relative to each other.

In the illustrated embodiment, N=3, but is not restricted thereto. The main bodies 11 and the couplers 120 cooperate to form the tower 20 having a predetermined length H1 along the C axis. The bottommost main body 11 of the tower 20 is mounted on the mounting portion 1011 of the mounting seat 101.

To ship the cart 100, the tower 20 can be disassembled into separate main bodies 11 and couplers 120. The separated components can be packaged to take up less space than conventional cart. Thereby, the cart 100 can be shipped more easily.

More specifically, the package size of conventional cart is approximately defined by multiplying the surface area of the base to the height of the tower. However, the tower 20 of the cart 100 of the instant disclosure may be disassembled into separate main bodies 11 and couplers 120. Thus, the height of the package size is effectively reduced. The package size can be reduced by at least 40%. Furthermore, if the long side of each main body 11 is arranged horizontally on the base 10, more space saving can be achieved.

Figure 3:
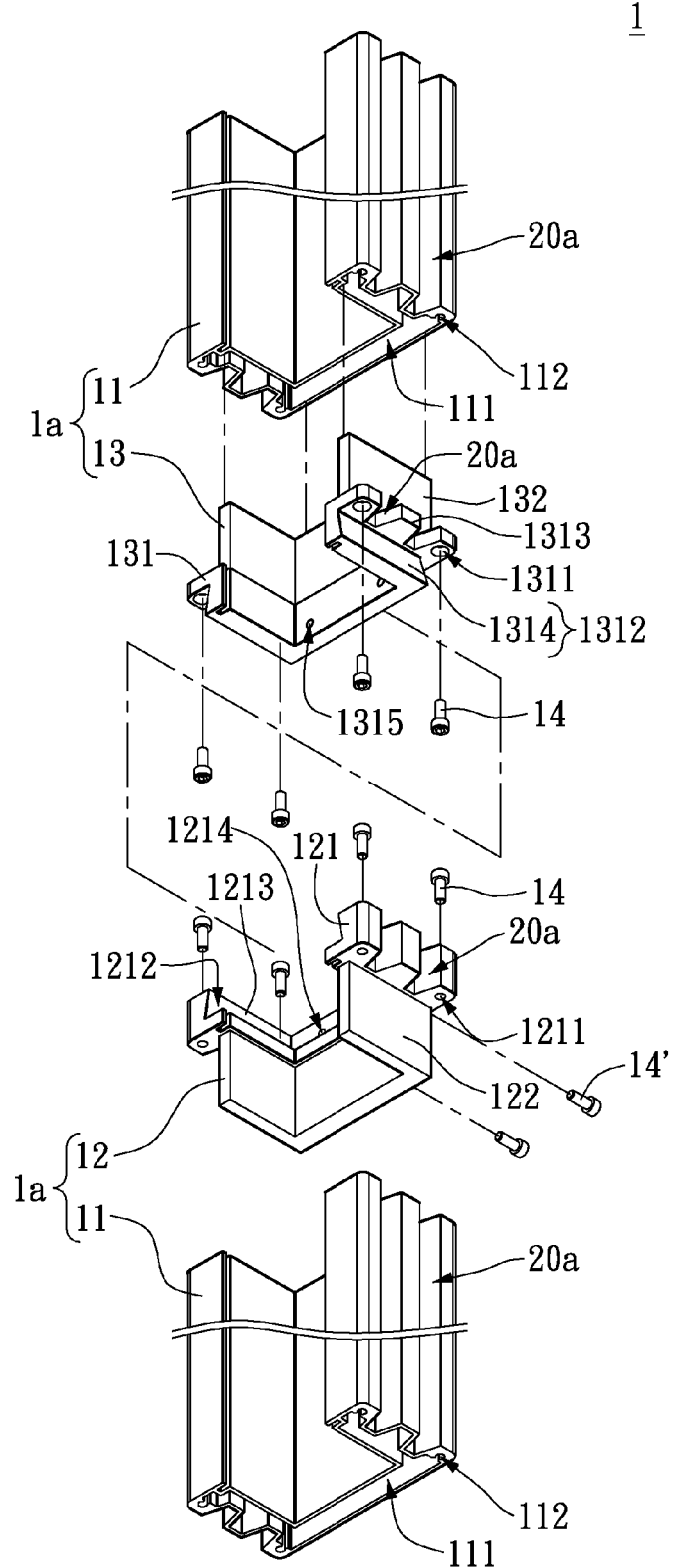
FIG. 3 is an exploded view showing the frame assembly.
Figure 4:
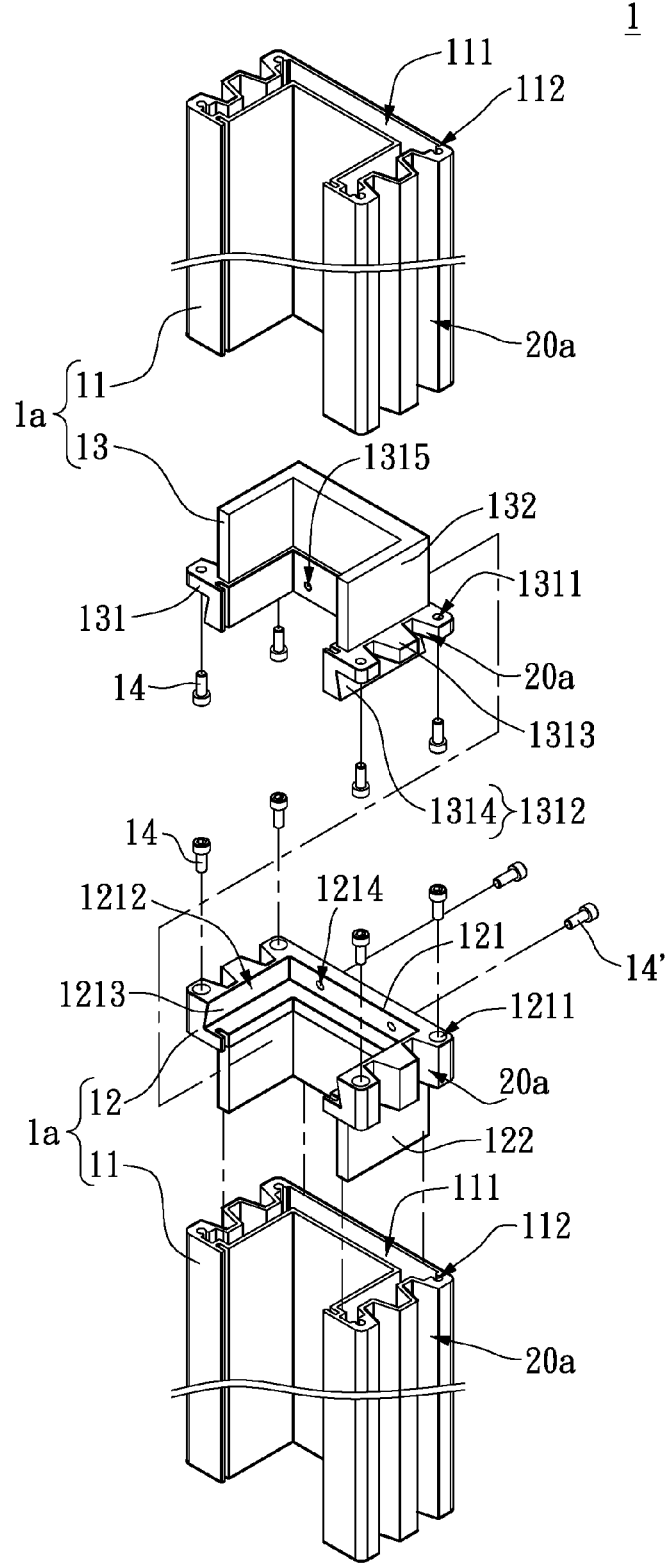
FIG. 4 is an exploded view showing the frame assembly from another direction.

Please refer to FIGS. 3 and 4. Further description for the couplers 120 and the main bodies 11 are provided herein. A substantially U-shaped receiving space 111 is defined internally of each main body 11. A plurality of thru holes 112 is formed on each main body 11 proximate to the channels 20a and communicates to the receiving space 111. Each coupler 120 includes a first coupling piece 12 and a second coupling piece 13.

The first coupling piece 12 has a first mating portion 121 and a first connecting portion 122. The bottom edge of the first mating portion 121 extends in forming the first connecting portion 122. The aforementioned channels 20a are partially and concavely formed on opposite sides (i.e., the left-hand side and the right-hand side) of the first mating portion 121. A plurality of first via holes 1211 is formed on the first mating portion 121 proximate to the channels 20a.

The first mating portion 121 has a tapered face identified by the numeral 1213. The tapered face 1213 defines a dovetail groove 1212 having a U-shaped cross-section of a tapered dovetail joint. The dovetail groove 1212 is further formed with a pair of first fixing holes 1214. The first connecting portion 122 has a substantially U-shaped cross-section.

The second coupling piece 13 has a second mating portion 131 and a second connecting portion 132. The second mating portion 131 is divided into a U-shaped lip member 1313 and a trapezoid shaped dovetail 1312. The upper and lower edge portions of the lip member 1313 extend oppositely in forming the second connecting portion 132 and the dovetail 1312. Furthermore, the aforementioned channels 20a are partially concavely formed on opposite sides (i.e., the left-hand and right-hand sides in FIG. 3) of the lip member 1313. A plurality of second via holes 1311 is formed on the lip member 1313 proximate to the channels 20a.

The dovetail 1312 has a sloped face 1314 that is shaped to mate matchingly with the tapered face 1213. A pair of second fixing holes 1315 is formed on the dovetail 1312 in alignment with the first fixing holes 1214 of the first mating portion 121. The second connecting portion 132 is substantially U-shaped.

When the first coupling piece 12 and the second coupling piece 13 are mounted on respective main bodies 11, the first connecting portion 122 and the second connecting portion 132 are inserted into the receiving space 111 of the respective main bodies 11. The first and second connecting portions 122, 132 prevent the first and second coupling pieces 12, 13 from displacing horizontally with respect to the C axis.

Then, screws 14 are driven into the first via holes 1211, the second via holes 1311, and the thru holes 112. Thus, the first and second coupling pieces 12, 13 are secured to adjacent main bodies 11 and prevented from displacing along the C axis.

Lastly, the dovetail 1312 of the second coupling piece 13 interlocks to the dovetail groove 1212 of the first coupling piece 12 to form the dovetail joint along the C axis. When joining the tapered face 1213 of the first coupling piece 12 with the sloped face 1314 of the second coupling piece 13, a pair of screws 14' is driven into the first fixing holes 1214 of the first coupling piece 12 and the second fixing holes 1315 of the second coupling piece 13. Thus, the first and second coupling pieces 12, 13 are secured to each other.

Based on the foregoing, the interlocking of the tapered face 1213 and the sloped face 1314 holds the first coupling piece 12 and the second coupling piece 13 in position relative to each other. The screws 14' secure the first and second coupling pieces 12, 13 to each other and prevent both components from displacing perpendicularly to the C axis.

Figure 5:
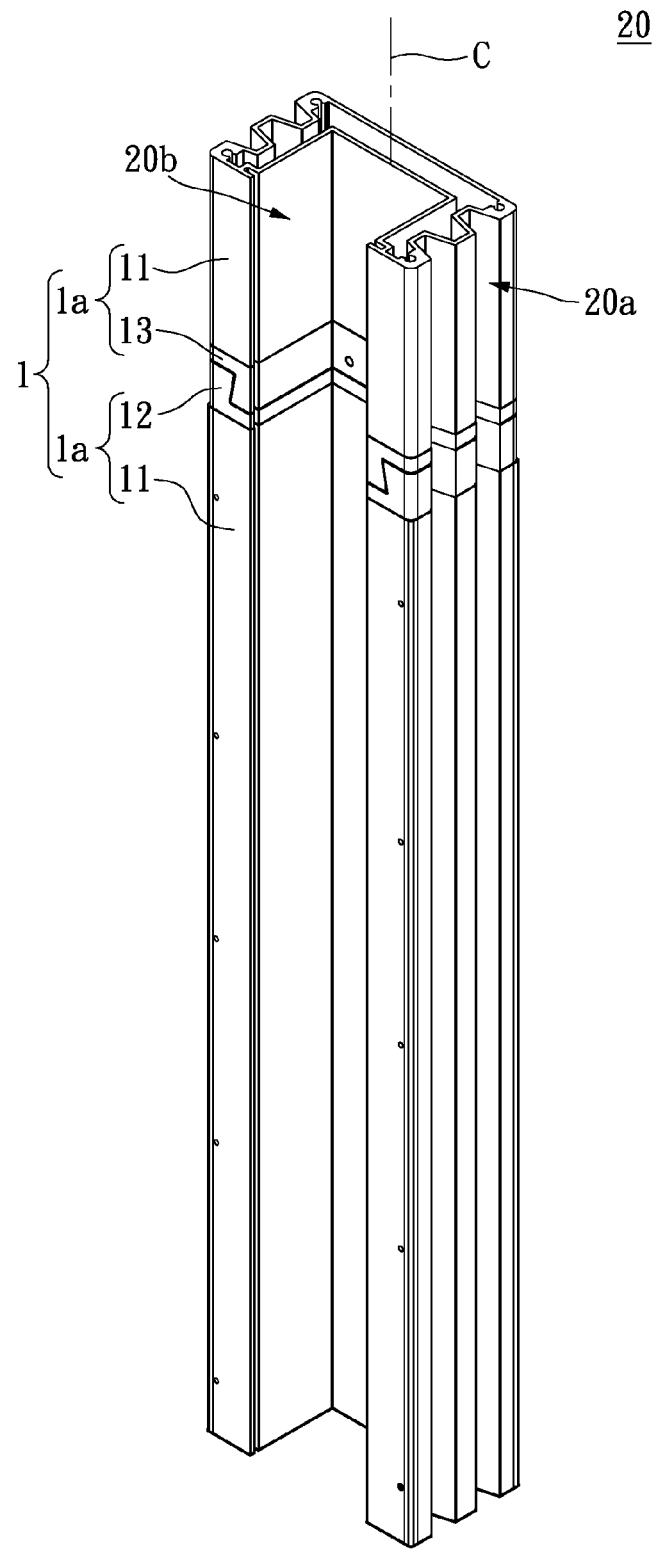
FIG. 5 is a perspective view showing the tower in another structural configuration.

For the illustrated embodiment, the assembled frame assembly 1 has a predetermined length H1. Alternatively, two main bodies 11 and one coupler 120 may be assembled together to have another predetermined length H2, as shown in FIG. 5.

Furthermore, in practice, the length of the main bodies 11 and the coupler 120 does not need to be the same.

For example, one main body 11 and one coupler 120 cooperate to define a support frame 1a. The frame assembly 1 includes three support frames X, Y, Z. The support frames X, Y, Z having a length of 1 unit, 2 units, and 4 units, respectively. These support frames X, Y, Z may be used independently or in group to provide different scenarios listed in the table below. In other words, the support frames X, Y, Z are used selectively in providing seven possible configurations for the frame assembly 1. Each configuration has a distinct predetermined length.

| Combination | Predetermined Length |
| --- | --- |
| X | 1 |
| Y | 2 |
| Z | 4 |
| X + Y | 3 |
| X + Z | 5 |
| Y + Z | 6 |
| X + Y + Z | 7 |

Thus, based on the customer requirement, the manufacturer can ship one of the suitable combinations to the customer while saving the manufacturing cost.

When mounting the bottommost main body 11 of the tower 20 on the mounting portion 1011 of the mounting seat 101, screws (not shown) are driven from underneath the mounting seat 101 through the mounting portion 1011 and into the thru holes 112 of the main body 11 along the C axis. Thus, the tower 20 is secured to the mounting seat 101.

Figure 6:
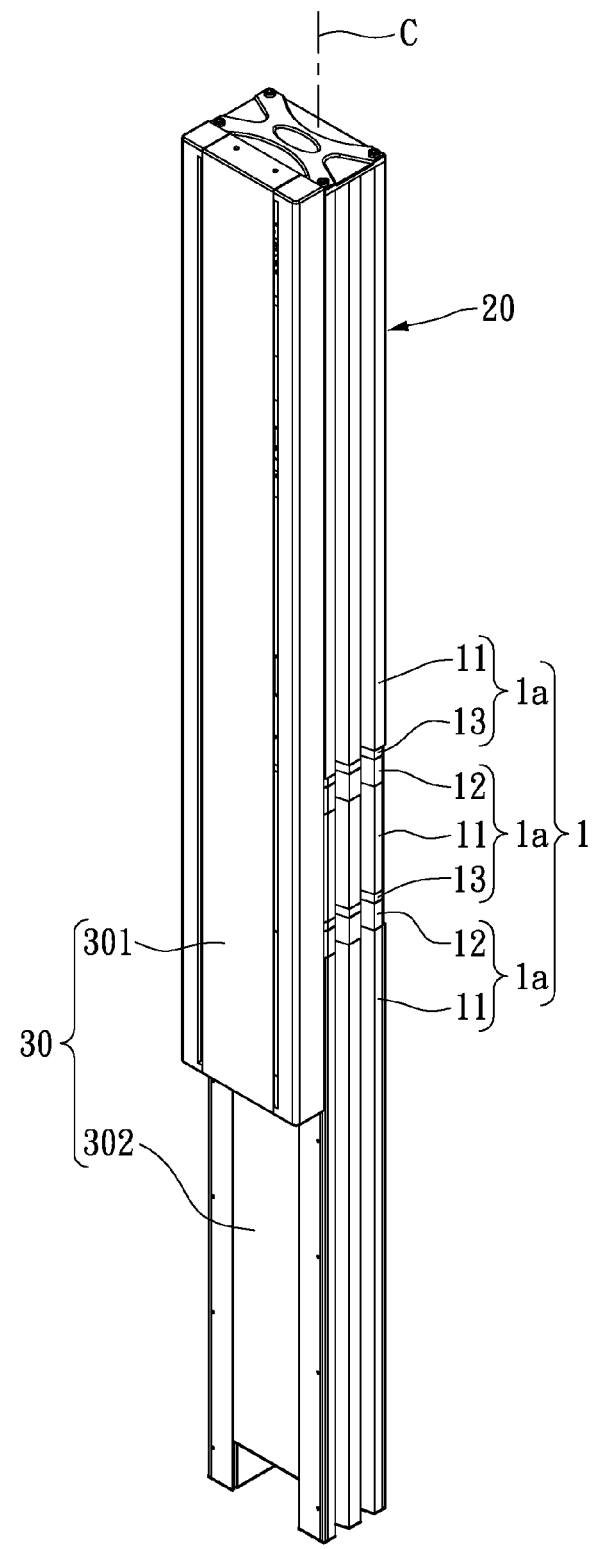
FIG. 6 is a perspective view showing the cover mounted on the tower.

Please refer to FIG. 6. The cover 30 includes a first covering portion 301 and a second covering portion 302. The first and second covering portions 301, 302 are mounted on the tower 20 and cover the trough 20b.

In operation, the first covering portion 301 may be utilized to cover a height-adjusting mechanism (not shown) disposed inside the trough 20b. Whereas the second covering portion 302 may be utilized to cover the wiring (e.g., for power or signal transmission) disposed inside the trough 20b. The cover 30 provides aesthetic effect and prevents accidents due to exposed wires.

Please refer back to FIG. 1, where the cart component 40 is mounted on the tower 20 or the cover 30. For the illustrated embodiment, the cart component 40 includes a monitor 401 and a work platform 402, but is not restricted thereto.

Based on the foregoing, the tower 20 of the cart 100 is constructed of main bodies 11 and the couplers 120. For the shipping journey, the tower 20 can be disassembled into separate main bodies 11 and couplers 120, thus reducing the overall package size of the cart 100. The shipping process is thus facilitated.

In addition, the frame assembly 1 can be configured to have different predetermined lengths to address the customer requirements. After the proper size has been chosen, the frame assembly 1 having appropriate frame support combination can be shipped to save manufacturing cost.

The descriptions illustrated supra set forth simply the preferred embodiment of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A modular cart, comprising:
   a base having a mounting seat supported on wheels, the mounting seat being movably disposed on a working surface through the wheels, an axis vertically extending away from the working surface being defined by the mounting seat;
   a tower being mounted on the mounting seat and having N number of main bodies and at least one coupler, the number of couplers being defined by the expression of N−1;
   wherein the coupler includes a first coupling piece and a second coupling piece, the first coupling piece has a first mating portion and a first connecting portion, and the second coupling pieces has a second mating portion and a second connecting portion,
   wherein the first mating portion having an inner surface that defines a dovetail groove, and the second mating portion forms a dovetail, and wherein the dovetail interlocks the dovetail groove along a direction perpendicular to the axis to hold the first and second coupling pieces in position relative to each other,
   wherein each main body has a pair of receiving spaces formed on opposite ends thereof, and the receiving spaces of the adjacent ends of the main bodies receive the first connecting portion and the second connecting portion, respectively,
   wherein N≥2 and is an integer, with the main bodies and the coupler cooperatively defining a predetermined length, and the coupler is connected between two main bodies.

2. The modular cart of claim 1, wherein the inner surface of the first mating portion is contacted by an outer surface of the dovetail to hold the first coupling piece and the second coupling piece in position relative to each other.

3. The modular cart of claim 1, wherein at least one first via hole is formed on the first mating portion, with at least one second via hole is formed on the second mating portion, and wherein an equal number of screws are driven into the first via hole and the second via hole along the axis to secure the first coupling piece and the second coupling piece on the main bodies.

4. The modular cart of claim 1, wherein at least one screw is driven into the first coupling piece and the second coupling piece substantially perpendicular to the axis for securing to each other.

5. The modular cart of claim 1, wherein each main body is capable of being made into at least two different lengths.

6. The modular cart of claim 1, wherein the tower has a substantially U-shaped cross-section perpendicular to the axis, wherein a trough is formed extendingly on the tower along the axis, wherein at least one channel is formed on each of opposite sides of the tower, and wherein the modular cart further comprising a cover mounted on the tower for covering the trough.

7. The modular cart of claim 1, wherein the axis is substantially perpendicular to the working surface.

8. The modular cart of claim 1, wherein at least one screw is driven into the mounting seat and the tower for securing the tower onto the mounting seat.

* * * * *